(No Model.)  2 Sheets—Sheet 1.

A. E. COBB.
STEAM ENGINE.

No. 599,830.  Patented Mar. 1, 1898.

Witnesses:
G. B. Towles
H. A. Daniels

Inventor
Alton E. Cobb
By C. M. Carter
atty (No Model.) 2 Sheets—Sheet 2.

A. E. COBB.
STEAM ENGINE.

No. 599,830. Patented Mar. 1, 1898.

Witnesses:
G. B. Towles
H. A. Daniels

Inventor:
Alton E. Cobb
By C. M. Carter
Atty

UNITED STATES PATENT OFFICE.

ALTON E. COBB, OF PHŒNIX, ARIZONA TERRITORY.

STEAM-ENGINE.

SPECIFICATION forming part of Letters Patent No. 599,830, dated March 1, 1898.

Application filed May 16, 1894. Serial No. 511,433. (No model.)

*To all whom it may concern:*

Be it known that I, ALTON E. COBB, a citizen of the United States, residing at Phœnix, in the county of Maricopa and Territory of Arizona, have invented certain new and useful Improvements in Steam-Engines; and I do hereby declare the following to be a full, clear, and exact description of the invention, such as will enable others skilled in the art to which it appertains to make and use the same.

This invention relates to steam-engines; and it consists in certain improvements in the valve-gear and operating mechanism, as hereinafter set forth and claimed, the object of the invention being to so construct the exhaust and cut-off valves and operating mechanism that quick port opening and cut off may be obtained automatically.

Figure 1:
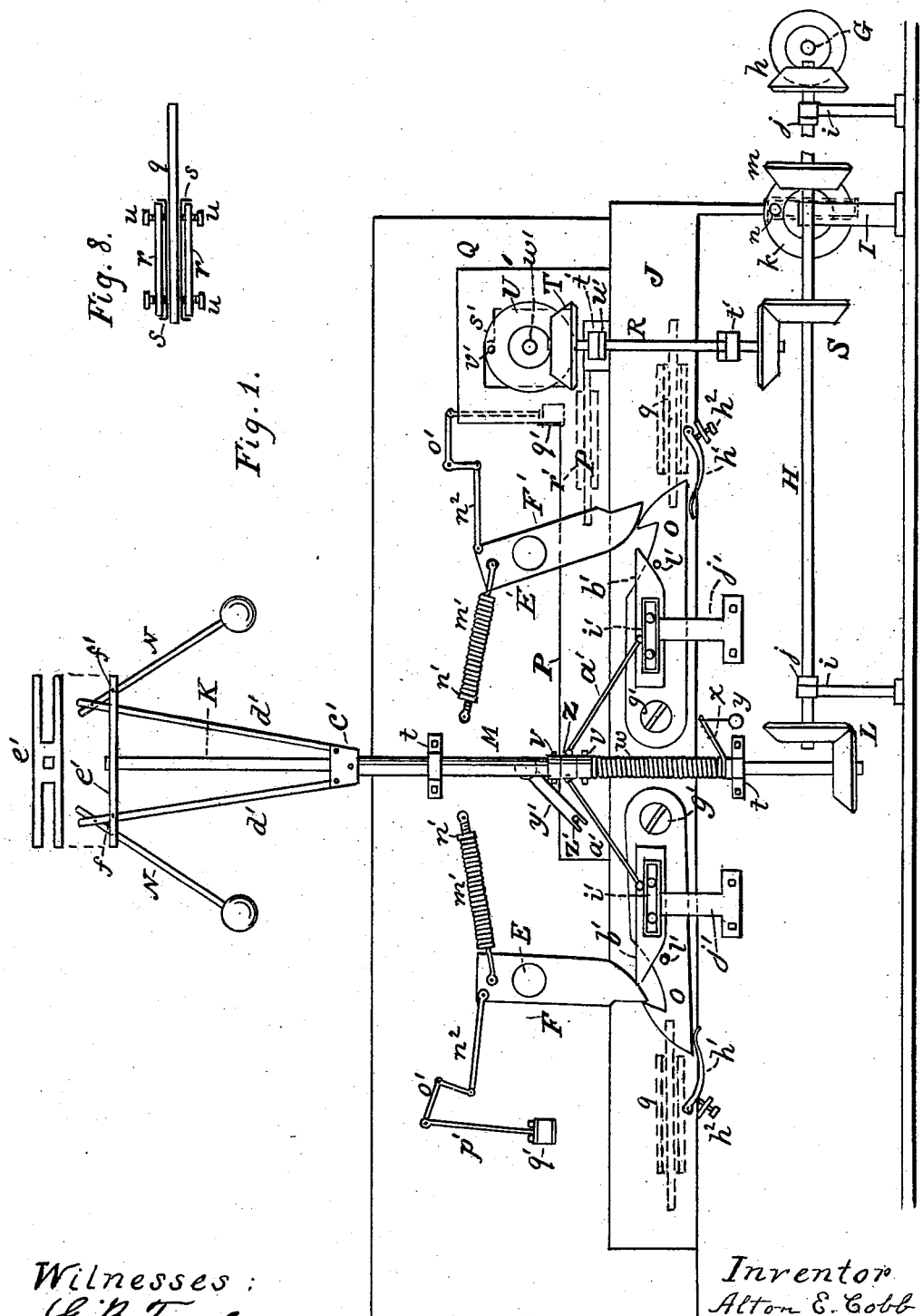
Figure 2:
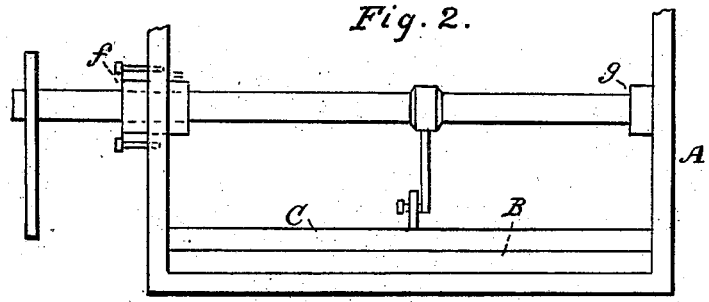
Figure 3:
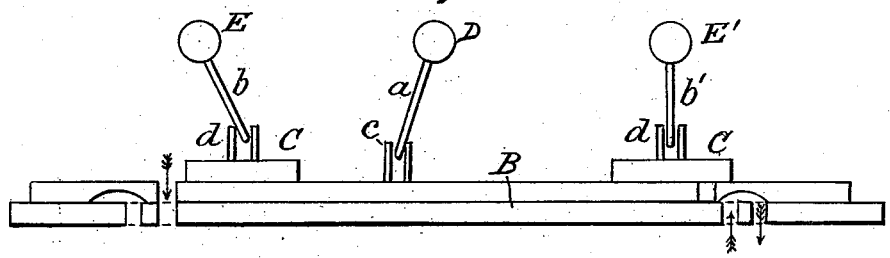
Figure 4:
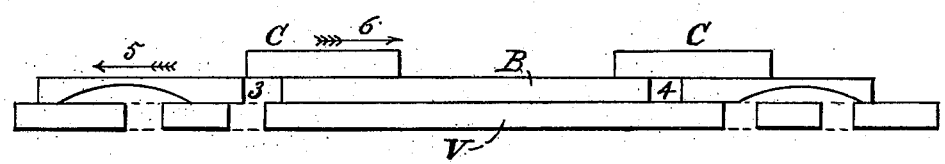
Figure 5:
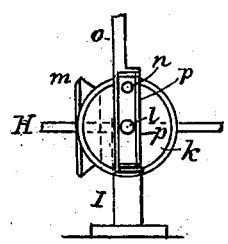
Figure 6:
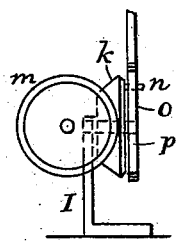
Figure 7:
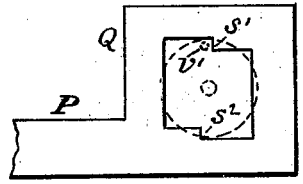

In the accompanying drawings, Figure 1 represents in side view the valve-operating mechanism of a steam-engine constructed according to my invention. Fig. 2 illustrates in section the steam-chest and other details. Fig. 3 illustrates in section the exhaust and cut-off valves. Fig. 4 further illustrates the valves in section. Figs. 5 and 6 show different views of gearing through which the main slide is actuated. Fig. 7 is a partial side view of an operating-slide. Fig. 8 illustrates the bearings of two slides.

A designates the steam-chest, in which is located a slide-valve B, a cut-off valve C being mounted on valve B, as shown. In the steam-chest are mounted on the same plane three rocking shafts, which have bearings in the walls of said steam-chest, the central shaft being indicated by D and the other two shafts being indicated by E and E', respectively. The shaft D has an arm $a$, which extends downward therefrom and has a loose connection with the slide-valve B, as seen at $c$, and the shafts E E' have arms $b$ and $b'$, respectively, which have loose connections $d$ with the cut-off valve C, so that the valves B and C may be severally actuated by the rocking of shaft D and shafts E E'. Each of the said rocking shafts is extended at one end, a stuffing-box $f$ being provided to form a close joint of the shaft and the wall of the steam-chest. The opposite ends of the shafts are provided with bearings $g$ within the steam-chest. On the extended ends of the shafts E E' are secured the arms F F', which extend downward and connect with other devices, as hereinafter set forth.

G indicates the crank-shaft of the engine, which is connected by beveled gear-wheels $h$ with a driving-shaft H, which is mounted in bearings $i$, collars $j$ being made fast to said shaft H. A standard I is adjacent to the driving-shaft H, and a pin $l$ extends from said standard and forms the axle of a beveled gear-wheel $k$, which connects with a beveled gear-wheel $m$ on the driving-shaft H. A fixed pin $n$ extends from wheel $k$ near its periphery into a slot in an arm $o$, which extends down from a horizontal slide J, which is the main slide, and actuates the cut-off valve C before mentioned. The slot in arm $o$ is adjustable, one side being formed by a bolted strap $p$, which may be moved for the purpose of taking up wear.

The slide J moves on two bearings $q$, which project laterally from the cylinder or the steam-chest. Each bearing-piece $q$ is between two lugs $r$, which are fast on the slide J. Washers or brasses $s$ are placed one above and the other under the bearing-piece $q$ and pressed by set-screws $u$, passed through the lugs $r$ for the purpose of taking up lost motion. (See Fig. 8.)

K indicates a vertical governor-shaft which is mounted in bearings $t$ and has connection with the driving-shaft H by beveled gearing L. A long sleeve M is placed on the governor-shaft, and collars $v$ and a spring $w$, on which said sleeve rests, serve to hold shaft K in position. An arm $x$ extends from shaft K and has a weight $y$, which is adjustable on said arm and is intended to regulate the speed of the engine. Two of the collars $v$ are fast on the sleeve M, and between them is a collar $z$, which is loose on said sleeve and has pivotally connected with collar $z$ two arms $a'$, which extend in opposite directions and are each connected with a wedge-shaped slide $b'$ hereinafter referred to. A collar $c'$ is secured to the upper end of the sleeve M, and to the upper end of shaft K is secured a horizontal bar $e'$, either end of which is slotted or bifurcated, as shown. Two rods or arms $d'$ are connected at their lower ends with the collar $c'$ on sleeve M and extend upward through the slots in the horizontal bar $e'$ and are pivoted at their upper ends to the inner ends of the governor-arms N, which latter are pivotally connected with the slotted bar $e'$, as seen at $f'$, so that the downward movement of the collar $c'$ throws outward the governor-arms N, and the upward movement of said collar brings the arms N inward.

The slide J has two hooks O pivotally connected with it, as seen at $g'$, said hooks being pressed upward by springs $h'$, connected with said slide and provided with adjusting-screws $h^2$. Adjacent to each hook O is a wedge-shaped slide $b'$, which has a bearing $i'$, on which said slide may move forward and backward, said bearing being carried by a standard $j'$. The slides $b'$ being, as before stated, connected by arms $a'$ with the collar $z$, which is loose on the sleeve M of the governor-shaft, said slides are moved forward and backward by the vertical movements of said sleeve.

On each of the hooks O is a projecting pin or stud $l'$ in position to be impinged against by one of the wedge-shaped slides $b'$, so as to press downward said hook, so that as the hook is moving forward with the slide J it may pass the catch-arm F or F', which is just above said hook, and the latter, having passed the catch-arm, is immediately raised by a spring $h'$ to connect with said arm and is held up until the slide J moves back and the cut-off is required. The stud $l'$ then strikes the slide $b'$ and the hook is again pressed down until the catching-arm is passed, and the cut-off is immediately closed by the action of the spring $m'$, one of these springs $m'$ being connected with each of the catch-arms F F' above the connection of the catch-arm with the rock-shaft. Each spring $m'$ is threaded at the end nearest the governor-shaft, a nut $n'$ being placed thereon, by means of which the spring may be tightened so as to act quickly, and a quick cut-off may be effected.

Each of the catch-arms F F' is connected by a rod $n^2$ with a pivoted elbow-lever $o'$, which is connected with the stem $p'$ of the plunger in an air dash-pot $q'$, which is for the purpose of stopping the cut-off valve C when it is sprung shut or over a port of the slide-valve B.

P indicates a slide by the movement of which the slide-valve B is actuated, said slide having movement on two bearings $r'$, which are similar in construction to the bearings of the slide J before described, being provided with washers and adjusting-screws passed through lugs. The slide P has formed at one end a rectangular frame Q, which has an inner upper shoulder $s'$ and a lower shoulder $s^2$. A vertical shaft R is mounted in bearings $t'$ and provided with collars $u'$, said shaft having connection at its lower end with the driving-shaft H through beveled gearing S. At its upper end the shaft R has a beveled gear-wheel T, which engages with a beveled gear-wheel U, which is mounted on an arm $w'$, which extends from the cylinder or from the steam-chest, and a pin $v'$ is fixed to the wheel U near its periphery, said pin being in position for contact with each of the shoulders $s'\, s^2$ successively as the wheel U is rotated, motion being thus imparted from the driving-shaft H to the slide P. The pin $v'$ first moving against the shoulder $s'$ moves the slide in one direction a certain distance, when the pin leaves that shoulder and the slide stands still until the pin comes in contact with the lower shoulder $s^2$, when the slide moves in the opposite direction.

Fixed to the extended end of the central rock-shaft D is an arm $y'$, the free end of which is slotted or bifurcated, so that a loose connection is formed of said arm $y'$ with the slide P by a pin or stud $z'$ on the slide, and as the latter is moved forward and backward the slide-valve B is actuated.

In Fig. 4 is shown the relative position of valves when the ports are about to open to admit steam into the cylinder V, the valve B having port-openings 3 and 4 moving in the direction indicated by the arrow 5 and the cut-off valve C moving on valve B in the direction indicated by the arrow 6. In Fig. 3 are shown ports wide open and valve C still moving from the port as it would under a heavy load or low steam. Thus a quick port-opening and a quick cut off are obtained by the movements of the valves B and C in opposite directions, whereby the full steam-pressure from the boiler on the piston is obtained, from which a considerable increase in the amount of horse-power of the engine and a saving of fuel result. When the port is wide open, the movement of the slide-valve B stops, leaving the port open until the cut-off closes, unless the cut-off is late, in which case the cut-off is effected by the valve B, as it would be in a common slide-valve engine. Such stopping of the valve B is caused by the pin $v'$ on gear-wheel U passing from the shoulder $s'$ in the frame Q of the slide P, when the latter stops and does not move until said pin $v'$ strikes the shoulder $s^2$, when the slide P commences its reverse movement and effects a cut-off, if the automatic cut-off is too late, as it would be in case of low steam or when just starting, and also effects the exhaust.

I claim—

1. The combination, with a slide-valve which moves on a steam-cylinder, of a rock-shaft mounted in the steam-chest and provided with an arm which has a loose connection with said slide-valve, another arm, bifurcated and made fast to the extended end of said rock-shaft, a slide having, at one end, a loose connection with said bifurcated arm, a rectangular frame on one end of said slide, said frame being provided with an upper and a lower shoulder, gearing adapted to connect with said shoulders and engage said slide, and driving mechanism, substantially as set forth and described.

2. The combination, with the cut-off valve of an engine, of two rock-shafts having arms loosely connected with said valve, catch-arms, secured to the extremities of said rock-shafts, a slide having a reciprocating movement, two hooks pivotally connected with said slide and adapted to connect with said catch-arms, springs adapted to press upward said hooks and other springs adapted to actuate said valve through said rock-shafts, wedge-shaped slides, adapted to engage said hooks, a vertical governor-shaft with weighted arms, a movable sleeve on said governor-shaft, connected by two pivoted arms, extending in opposite directions, with said wedge-shaped slides, substantially as set forth and described.

3. The combination with the cut-off valve of an engine and a main slide having connection therewith, of two wedge-shaped slides in position to connect with said main slide, a vertical, governor-shaft, a movable sleeve on said shaft, a spring supporting said sleeve, two pivoted arms connected with said sleeve and with said wedge-shaped slides, whereby reciprocating movement is imparted to said wedge-shaped slides, substantially as set forth and described.

4. The combination with two wedge-shaped slides, of a governor-shaft, a sleeve, loose on said shaft, a spring supporting said sleeve, a collar on the upper end of said sleeve, a horizontal, slotted bar, secured to the upper end of said shaft, two governor-arms extending through and pivoted to said slotted bar, two arms or rods connected with said collar and pivotally connected with the upper ends of said governor-arms, and two pivoted arms connected with a lower collar on said sleeve and with said wedge-shaped slides, substantially as and for the purposes described.

In testimony whereof I have affixed my signature in presence of two witnesses.

ALTON E. COBB.

Witnesses:
PHILIP K. HICKEY,
SEVERIN P. HOEFER.